US011865567B2

(12) United States Patent
Lo

(10) Patent No.: US 11,865,567 B2
(45) Date of Patent: Jan. 9, 2024

(54) SPRAYER FOR MIXED SOLUTION AND WATER

(71) Applicant: YUAN MEI CORP., Changhua County (TW)

(72) Inventor: Shun-Nan Lo, Changhua County (TW)

(73) Assignee: YUAN MEI CORP., Changhua County (TW)

( * ) Notice: Subject to any disclaimer, the term of this patent is extended or adjusted under 35 U.S.C. 154(b) by 285 days.

(21) Appl. No.: 17/344,896

(22) Filed: Jun. 10, 2021

(65) Prior Publication Data

US 2022/0297145 A1 Sep. 22, 2022

(30) Foreign Application Priority Data

Mar. 17, 2021 (TW) ................................ 11010955.5

(51) Int. Cl.
*B05B 7/12* (2006.01)
*B05B 7/24* (2006.01)
*B05B 7/04* (2006.01)

(52) U.S. Cl.
CPC .......... *B05B 7/2443* (2013.01); *B05B 7/1209* (2013.01); *B05B 7/0408* (2013.01)

(58) Field of Classification Search
CPC .... B05B 7/2443; B05B 7/1209; B05B 7/0408
USPC .......................................................... 239/310
See application file for complete search history.

(56) References Cited

U.S. PATENT DOCUMENTS 3,254,844 A 6/1966 Blasnik et al.
RE29,405 E 9/1977 Gunzel, Jr. et al.
4,467,964 A * 8/1984 Kaeser ................. A46B 11/066 239/315
4,475,689 A 10/1984 Hauger et al.
4,708,292 A 11/1987 Gammons
5,445,288 A 8/1995 Banks
5,595,345 A 1/1997 Chura et al.
5,755,384 A 5/1998 Foster et al.
5,881,955 A 3/1999 Styne
5,957,387 A * 9/1999 Porta ....................... E03C 1/046 239/315
6,726,123 B2 4/2004 Wang
6,966,503 B1 11/2005 Chen
7,004,356 B1 2/2006 Sayers
7,124,962 B1 * 10/2006 Fryan .................... B05B 7/0408 239/394
7,237,728 B1 7/2007 Laible
7,303,099 B2 12/2007 Ophardt
7,445,167 B1 11/2008 Chen
7,661,604 B1 2/2010 MacLean-Blevins
D650,046 S 12/2011 Goodwin et al.
D670,982 S 11/2012 Goodwin et al.
8,608,091 B2 12/2013 Murray et al.
D708,301 S 7/2014 Jackson et al.
8,763,863 B2 7/2014 Quinlan et al.
8,814,005 B2 8/2014 Banks et al.
9,072,412 B2 7/2015 Ciavarella et al.
(Continued)

*Primary Examiner* — Chee-Chong Lee
(74) *Attorney, Agent, or Firm* — Xuan Zhang

(57) ABSTRACT

A sprayer for mixed solution and water is revealed. The sprayer can be used for cleaning objects, spraying mixed solution for agricultural purposes, and so on. The mixed solution is formed by liquid mixed with water, while the liquid can be fertilizers, pesticides, detergents, and etc. The sprayer can selectively spray out the mixed solution or water only.

10 Claims, 20 Drawing Sheets

(56) References Cited

U.S. PATENT DOCUMENTS

| | | | |
|---|---|---|---|
| 9,561,516 B2 | 2/2017 | Decker | |
| 9,630,767 B2 | 4/2017 | Gantenbein et al. | |
| 9,950,302 B1 | 4/2018 | Walsh et al. | |
| 9,980,430 B2 | 5/2018 | Goodwin et al. | |
| 10,022,742 B2 | 7/2018 | Goodwin et al. | |
| 10,582,830 B2 | 3/2020 | Fasson | |
| 2004/0135011 A1 | 7/2004 | Shanklin et al. | |
| 2004/0217205 A1 | 11/2004 | Kohs | |
| 2005/0173567 A1 | 8/2005 | Shanklin et al. | |
| 2005/0184171 A1 | 8/2005 | Shanklin et al. | |
| 2005/0189436 A1 | 9/2005 | Shanklin et al. | |
| 2005/0199751 A1 | 9/2005 | Shanklin et al. | |
| 2005/0211280 A1 | 9/2005 | Liu | |
| 2006/0091237 A1 | 5/2006 | Dodd | |
| 2006/0151634 A1 | 7/2006 | Pivovrov | |
| 2007/0095939 A1* | 5/2007 | Saunders | B05B 7/2462 239/536 |
| 2010/0163646 A1 | 7/2010 | Havlovitz et al. | |
| 2014/0076996 A1 | 3/2014 | Hayton et al. | |
| 2016/0059253 A1 | 3/2016 | Gooden et al. | |
| 2017/0050199 A1* | 2/2017 | Farcet | B05B 7/08 |
| 2018/0043378 A1 | 2/2018 | Gantenbein et al. | |
| 2018/0085766 A1 | 3/2018 | Gantenbein et al. | |
| 2018/0207667 A1 | 7/2018 | Black et al. | |
| 2019/0105671 A1 | 4/2019 | Carpanese | |

* cited by examiner

SPRAYER FOR MIXED SOLUTION AND WATER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a sprayer for mixed solution and water, especially to a sprayer for mixed solution and water which siphons liquid and mix the liquid with water to form mixed solution being sprayed onto a surface to be treated. The flow of the liquid drawn off can be adjusted. The sprayer can spray out not only the mixed solution, but also water for various purposes.

Description of Related Arts

Refer to U.S. Pat. No. 5,595,345, a double barrel sprayer for applying a diluted product is revealed. Some kind of liquid detergent is mixed with water. One end of the sprayer is connected to an inlet of a gardening hose while the other end of the sprayer is joined with a container which is filled with the liquid detergent. Water or a bubble solution formed by diluted liquid detergent mixed with air is sprayed out through a nozzle of the sprayer. The liquid detergent is mixed with water to form diluted liquid detergent in the container and the water is flowing into the container after each spraying process. Thus, the liquid detergent in the container will gradually be diluted by the water. Another disadvantage of such sprayer is in that the member used for introducing air into the sprayer is exposed outside that the exposed air inlet may be blocked by the bubbles generated, rendering poor performance. Besides, the product with such design is not aesthetically pleasing.

SUMMARY OF THE PRESENT INVENTION

Therefore, it is a primary object of the present invention to provide a sprayer for mixed solution and water in which liquid and water are mixed to form a mixed solution in a channel close to nozzles and then sprayed out through a mixture nozzle. Moreover, the nozzles include clear-water nozzles and the mixture nozzle which are separated from each other.

In order to achieve the above and other objects, a sprayer for mixed solution and water according to the present invention includes an operation portion and a housing. The operation portion is composed of a first end connected to a hose, a second end connected to the housing, and a water inlet channel. The hose is connected to a faucet for water supply and the housing is connected to a container which is filled with liquid for providing the liquid to the sprayer. An adjustment portion is arranged at the housing which consists of a diversion chamber and a plurality of distribution channels communicating with the diversion chamber. The diversion chamber includes a first diversion port and a second diversion port while the distribution channels include a first distribution channel, a second distribution channel, and a third distribution channel. The adjustment portion is provided with a ramp and a selector which can be aligned with the first diversion port or the second diversion port of the diversion chamber to close the first diversion port or the second diversion port selectively. The first diversion port is communicated with both the first distribution channel and the second distribution channel while the second diversion port is communicated with the third distribution channel. The housing further includes a liquid storage room. A siphon channel communicated with the container is arranged at the liquid storage room and is provided with a valve used to control the opening and closing of an opening of the siphon channel and further control the opening and closing and the amount of the liquid flowing from the container to the liquid storage room. One end of the valve is aligned with the ramp of the adjustment portion so that vertical movement of the valve under control of the ramp aligned with the valve. One end of the housing is connected to a spray portion which is provided with a clear-water channel and a mixture channel communicating with the second distribution channel and the third distribution channel respectively. The spray portion further includes a spray head which is provided with a plurality of clear-water nozzles with different spray patterns and a mixture nozzle for spraying out the mixed solution (such as bubble solution). The user may rotate an adjustment portion thereof to spray out mixed solution selectively. Water is introduced by the operation portion to generate a negative pressure. Thereby liquid in the container is delivered to the siphon channel through the liquid pipe due to siphon effect. The opening of the siphon channel is opened by the valve, so that the liquid is drawn into the liquid storage room and mixed with water from the second diversion port to form a diluted solution. Lastly, the diluted solution is blended with air in the mixture channel to get bubble solution and then sprayed out through the mixture nozzle. The user may also rotate the adjustment portion to spray out water selectively. By the selector aligned with the first diversion port and closing the second diversion port selectively, water introduced by the operation portion is flowing through the first distribution channel, the diversion chamber, entering the first diversion port, going through the second distribution channel, and arriving the clear-water channel to be sprayed out through the spray head. The spray head is manually rotated to select one of the clear-water nozzles aligned with the clear-water channel to spray out the water in different patterns, such as linear splash or radial splash.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn features and functions of the present invention, please refer to the following detailed description of the preferred embodiments and the related drawings.

The present invention provides a sprayer which is connected to a free end of a hose (such as garden hose) and used for mixing liquid, adjustment of flow, and providing multiple spray modes. One end of the hose is connected to a faucet so that water is delivered to the sprayer by the hose.

The sprayer can spray not only water but also mixed solution formed by water blended with liquid which is a liquid compound, such as a fertilizer, a pesticide, a detergent, their combinations, and etc.

Figure 1:
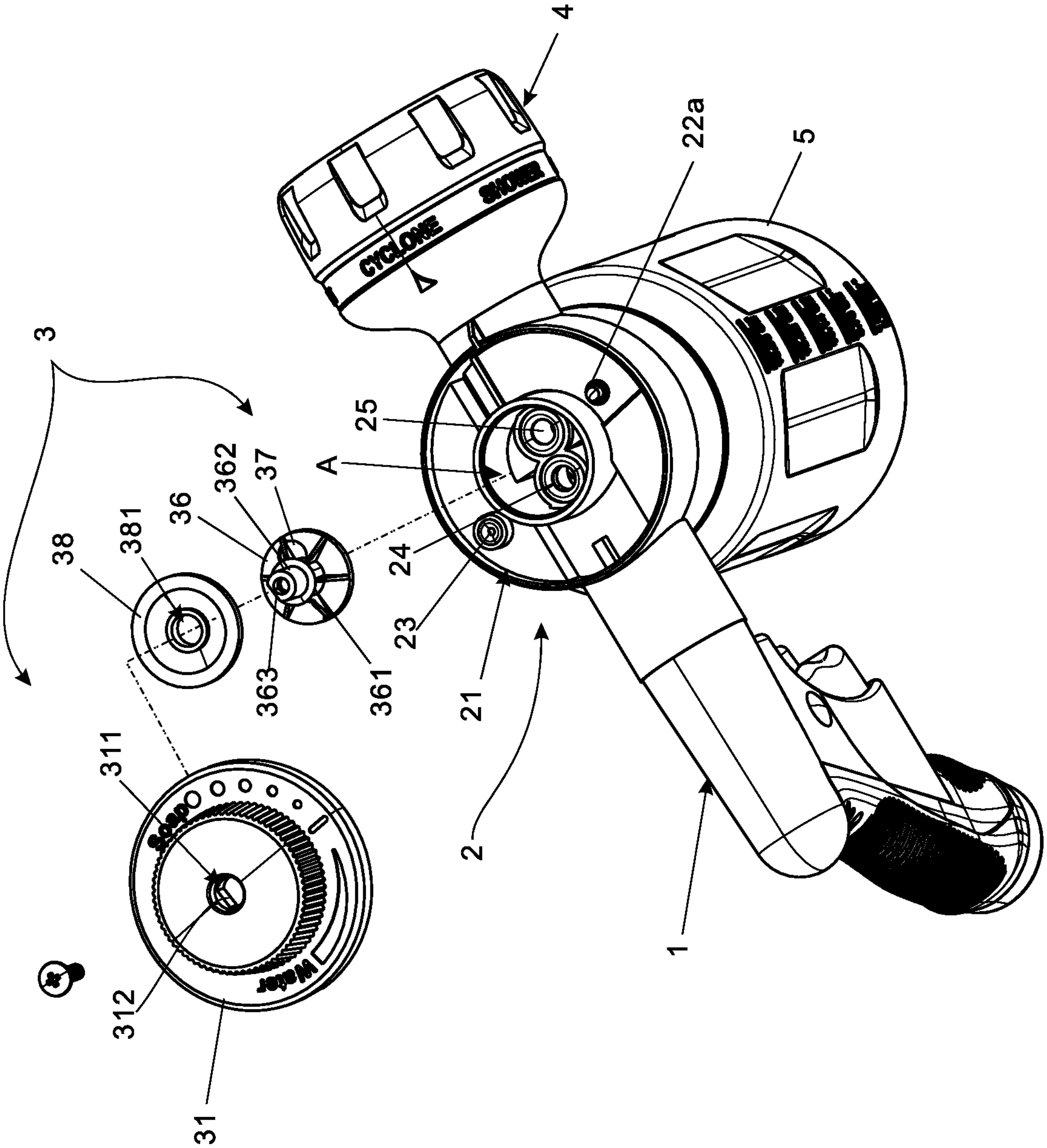
FIG. 1 is a partial assembly diagram and a partial exploded view of an embodiment according to the present invention.
Figure 2:
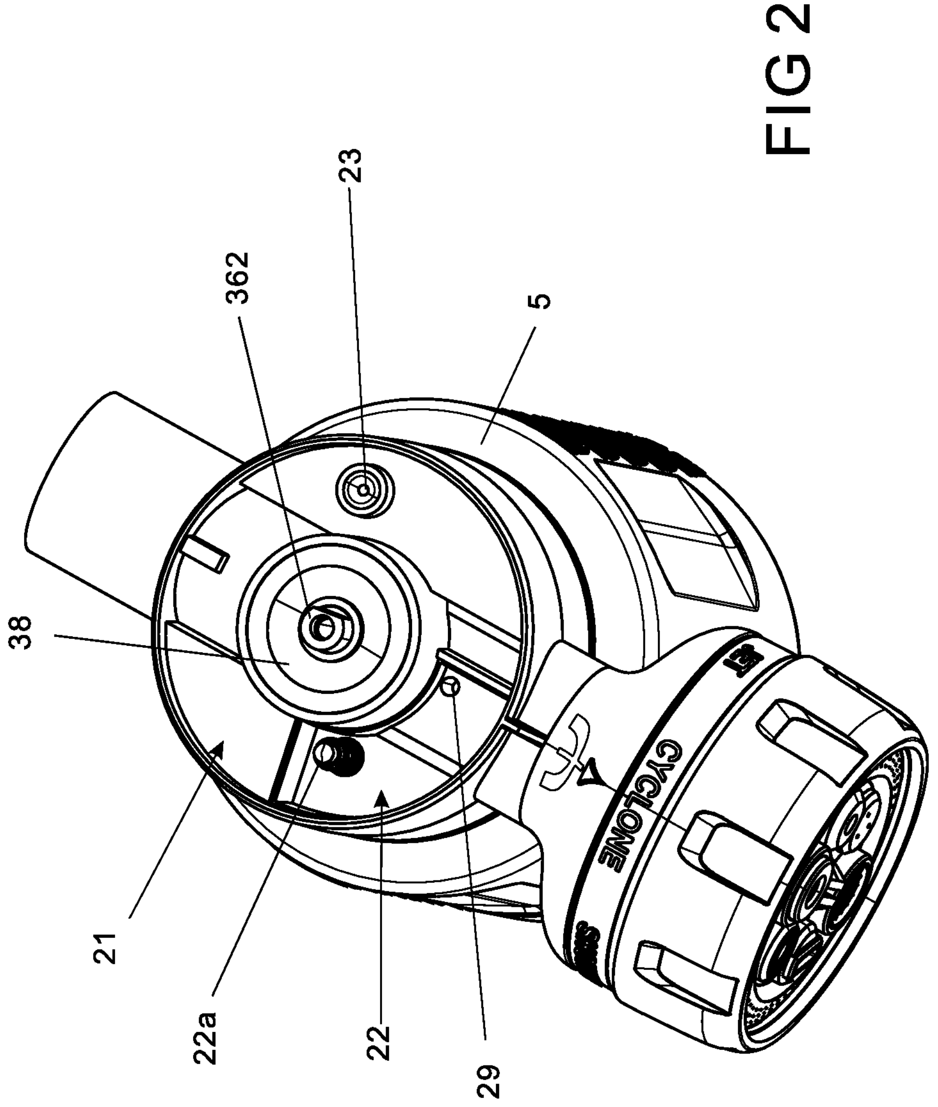
FIG. 2 is a partial perspective view of an embodiment according to the present invention.
Figure 11:
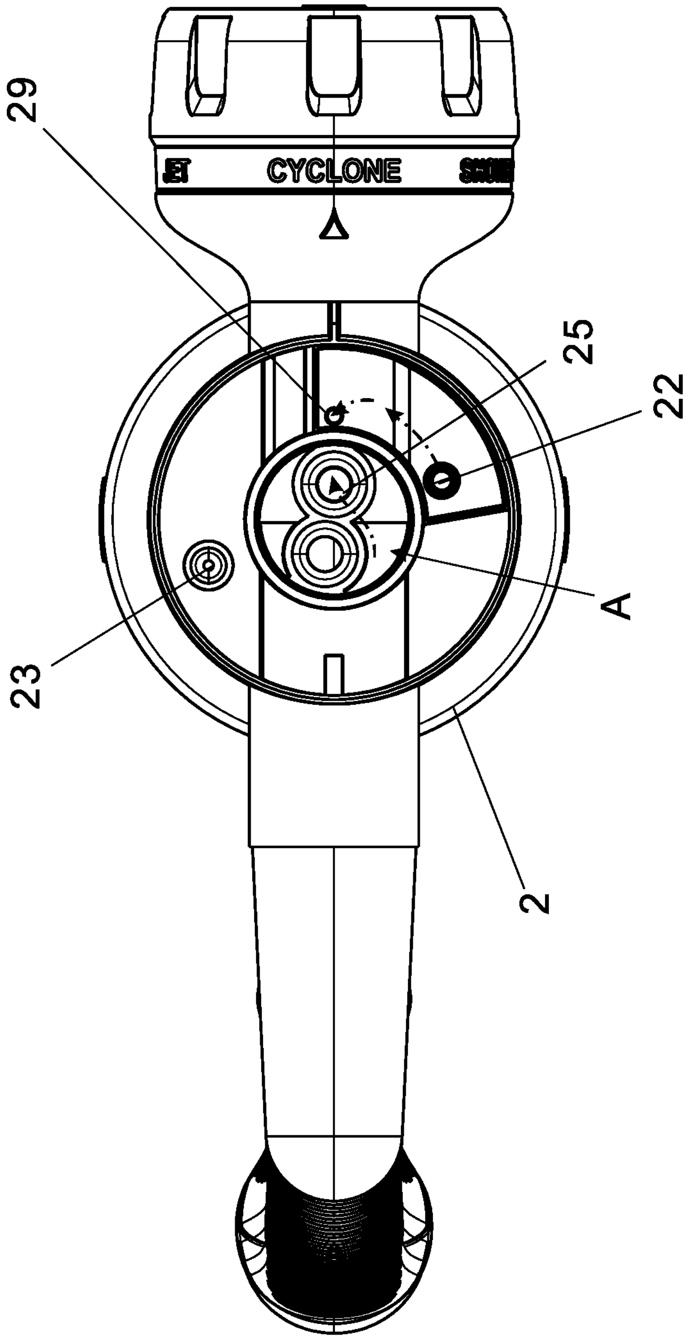
FIG. 11 is a sectional view of an embodiment according to the present invention assembled with a container.
Figure 12:
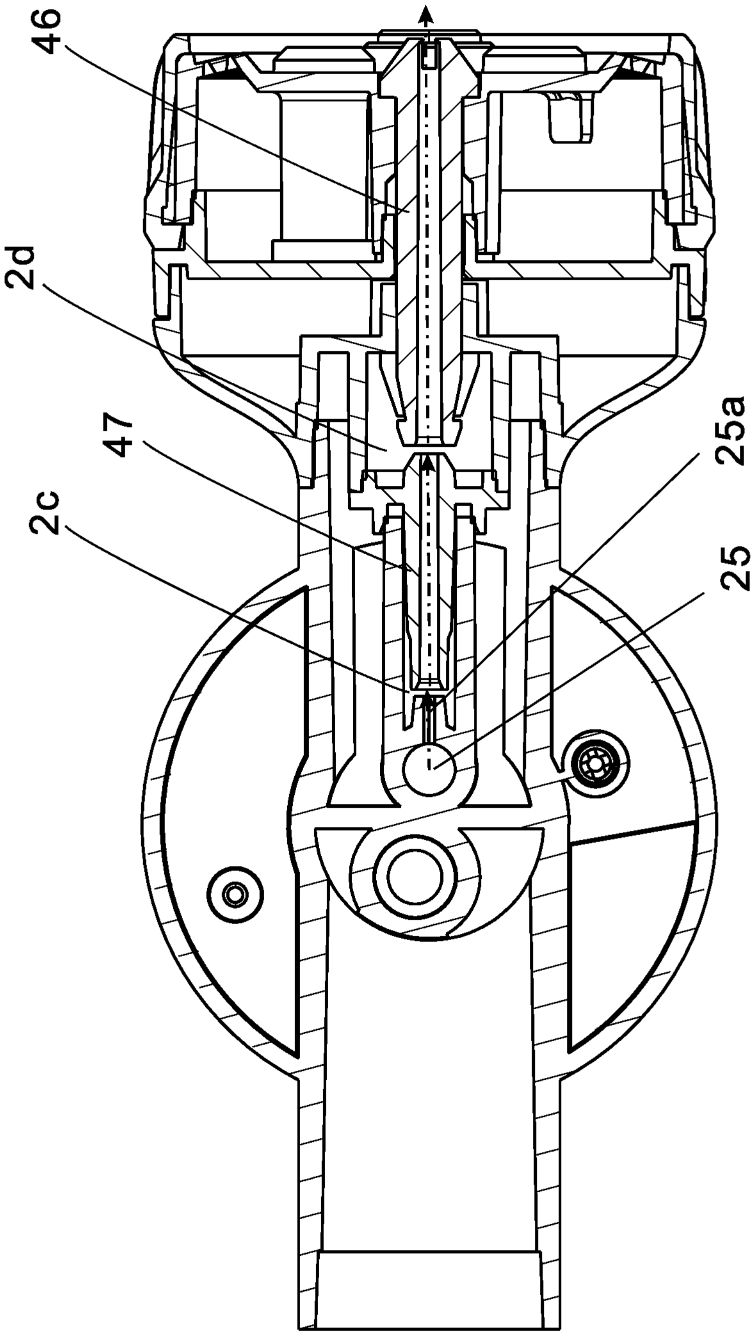
FIG. 12 is a top view of a cross section of an embodiment according to the present invention.
Figure 13:
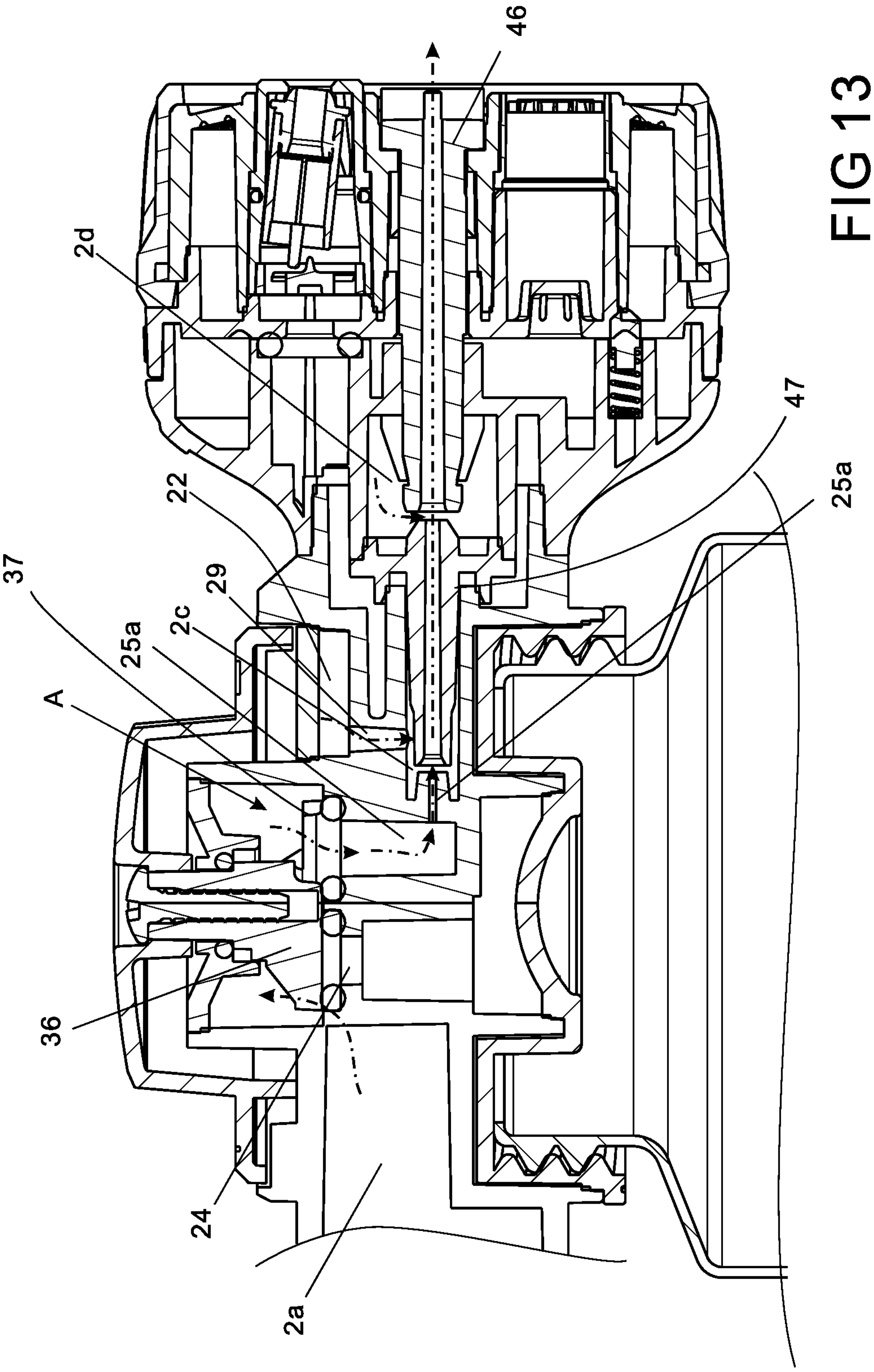
FIG. 13 is a partial enlarged sectional view of an embodiment according to the present invention.
Figure 14:
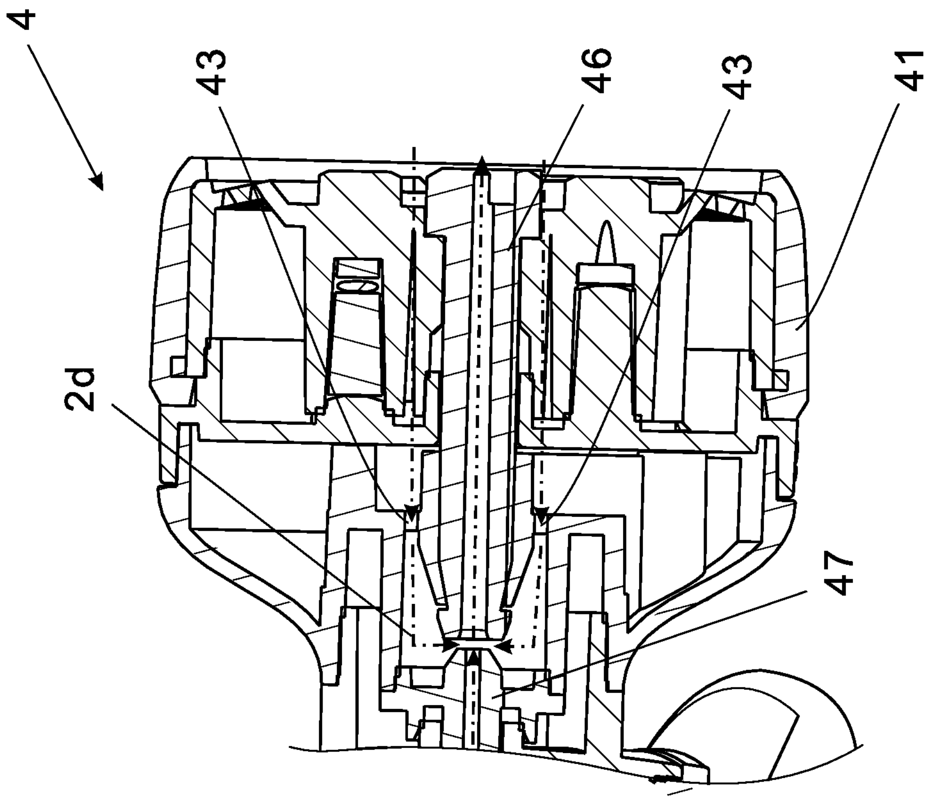
FIG. 14 is a partial enlarged cross-sectional view of a spray portion of an embodiment according to the present invention.

As shown in FIG. 1 and FIG. 11, the sprayer is connected to a container 5 which is filled with liquid and provided with a liquid pipe 51. The liquid can be concentrated detergent solution and the liquid pipe 51 is connected to the sprayer so that the liquid in the container 5 can be delivered to the sprayer due to siphon effect and mixed with water to form diluted solution with bubbles being sprayed out.

Referring to FIGS. 1-5, a sprayer according to the present invention includes an operation portion 1, a housing 2, an adjustment portion 3, and a spray portion 4.

One end of the operation portion 1 is connected to the hose and is provided with a water inlet channel 1*a* (as shown in FIG. 11).

The housing 2 consists of a first assembly end, an extended second assembly end, a diversion chamber A, a plurality of distribution channels, and a work surface 21. The first assembly end is connected with the operation portion 1 and the diversion chamber A is selectively aligned with and communicating with the distribution channels correspondingly.

Referring to FIGS. 1, 10, 11, and 18, the diversion chamber A of the housing 2 includes a first diversion port 24 and a second diversion port 25, each of which is provided with a water stop ring fitted on surface. The distribution channels include a first distribution channel 2*a*, a second distribution channel 2*b*, and a third distribution channel 2*c*. The diversion chamber A is space over the first diversion port 24 and the second diversion port 25 while the first diversion port 24 is communicating with both the first distribution channel 2*a* and the second distribution channel 2*b*. A pipeline 25*a* is formed by extension of the second diversion port 25 and is communicating with the third distribution channel 2*c*. The water inlet channel 1*a* of the operation portion 1 is connected with the first distribution channel 2*a*.

Referring to FIGS. 1-2 and FIGS. 9-11, a liquid storage room 22 is formed on one side of the work surface 21 and a top surface of the liquid storage room 22 is closed, so that the liquid storage room 22 becomes a space for temporary storage of the liquid. A siphon channel 52 is arranged at one end of the liquid storage room 22 and the other end of the liquid storage room 22 is provided with a delivery channel 29 which is communicating with the third distribution channel 2*c*. The siphon channel 52 is connected with a valve 22*a* and a spring 22*b* is fitted around the valve 22*a* for allowing the valve 22*a* to move and return to the original position axially in the siphon channel 52. The valve 22*a* includes a top end 22*a*1 and a bottom end 22*a*2. The siphon channel 52 is communicating with the liquid pipe 51 of the container 5 and used for delivering concentrated liquid to the liquid storage room 22. The valve 22*a* is used to control size of an opening of the siphon channel 52 for further control of the opening and closing and the amount of the liquid flowing from the siphon channel 52 to the liquid storage room 22. Then the concentrated liquid sent to the liquid storage room 22 is further delivered to the third distribution channel 2*c* by the delivery channel 29.

Referring to FIG. 1, the adjustment portion 3 is connected to the housing 2 and is composed of a rotary button 31, a selector 36, a valve hole 37, and a slide 38 with a through hole 381. The rotary button 31 consists of an assembly hole 311 and a first side portion 312 on one side of the assembly hole 311. The valve hole 37 is mounted on one end of a diameter of the selector 36 which includes a rod portion 361 extended from the center thereof, an axial portion 362 extended from the top end of the rod portion 361, and a second side portion 363 formed on the periphery of the axial portion 362. The adjustment portion 3 is provided with the selector 36 able to be rotated around the central axis of the diversion chamber A freely by manual operation.

The selector 36 is mounted in the diversion chamber A and the valve hole 37 is selectively aligned with one of the first and the second diversion ports 24, 25 and closing the other diversion ports 24, 25, while the through hole 381 of the slide 38 is mated with the axial portion 362 of the selector 36 and leaning against the surface on top of the rod portion 361, so that the slide 38 is tightly connected to the diversion chamber A. Thereby the selector 36 is limited at the diversion chamber A, without coming off easily. The axial portion 362 is protruding from the slide 38 and is fastened with a screw after being mounted into the assembly hole 311 of the rotary button 31 by the second side portion 363 aligned with the first side portion 312. Thereby, the rotary button 31 is able to be turned on the work surface 21 and the selector 36 is also turned by the rotary button 31 simultaneously.

Figure 3:
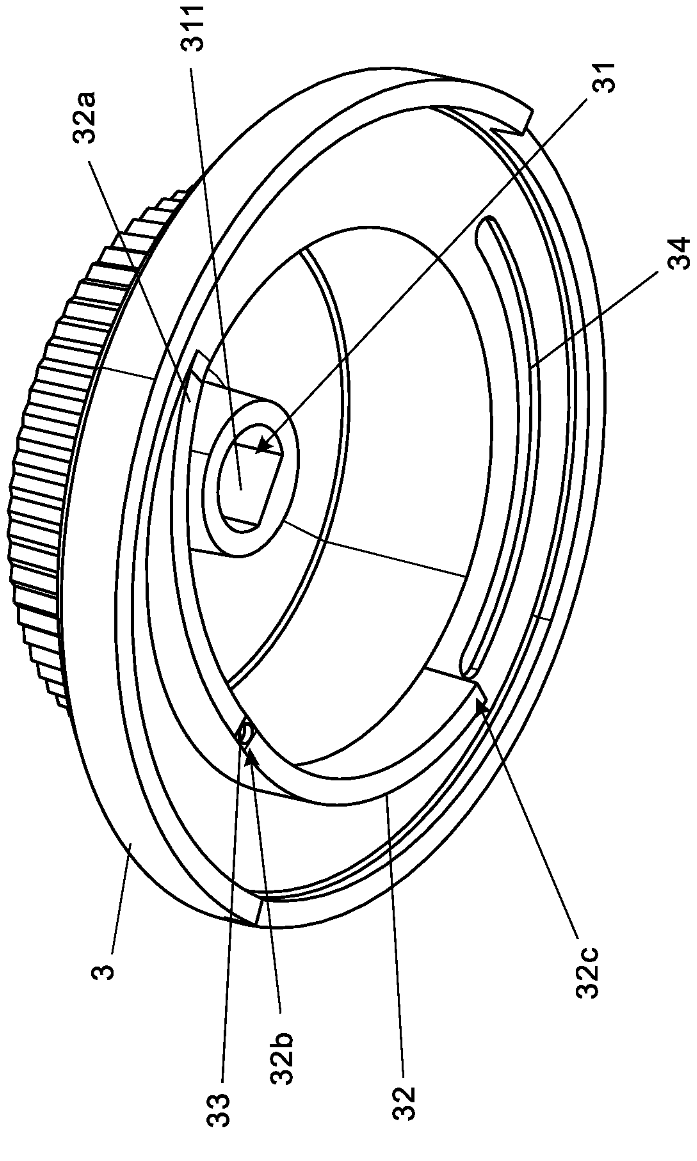
FIG. 3 is a perspective view of a rotary button of an embodiment according to the present invention.
Figure 7:
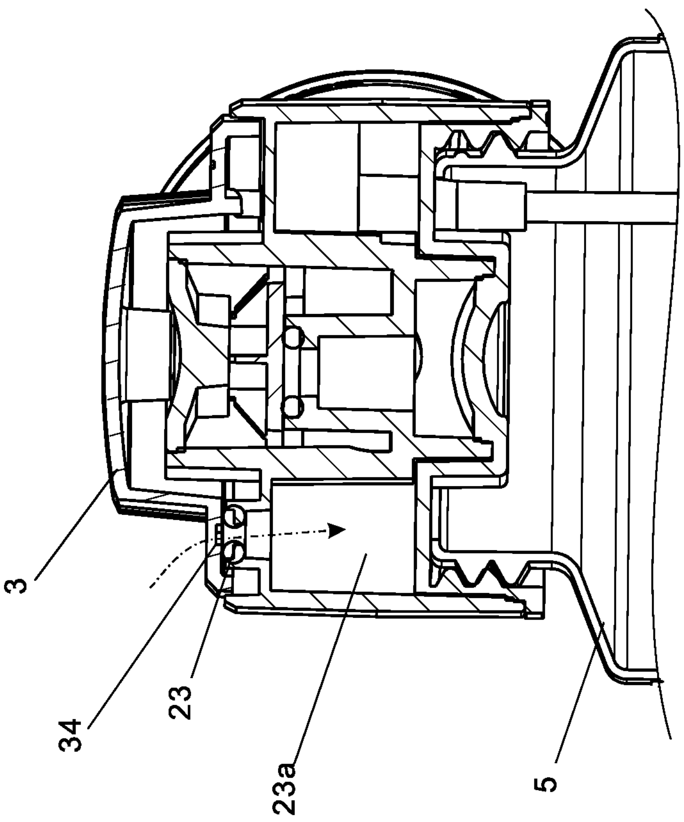
FIG. 7 is a partial sectional view of an embodiment according to the present invention.
Figure 8:
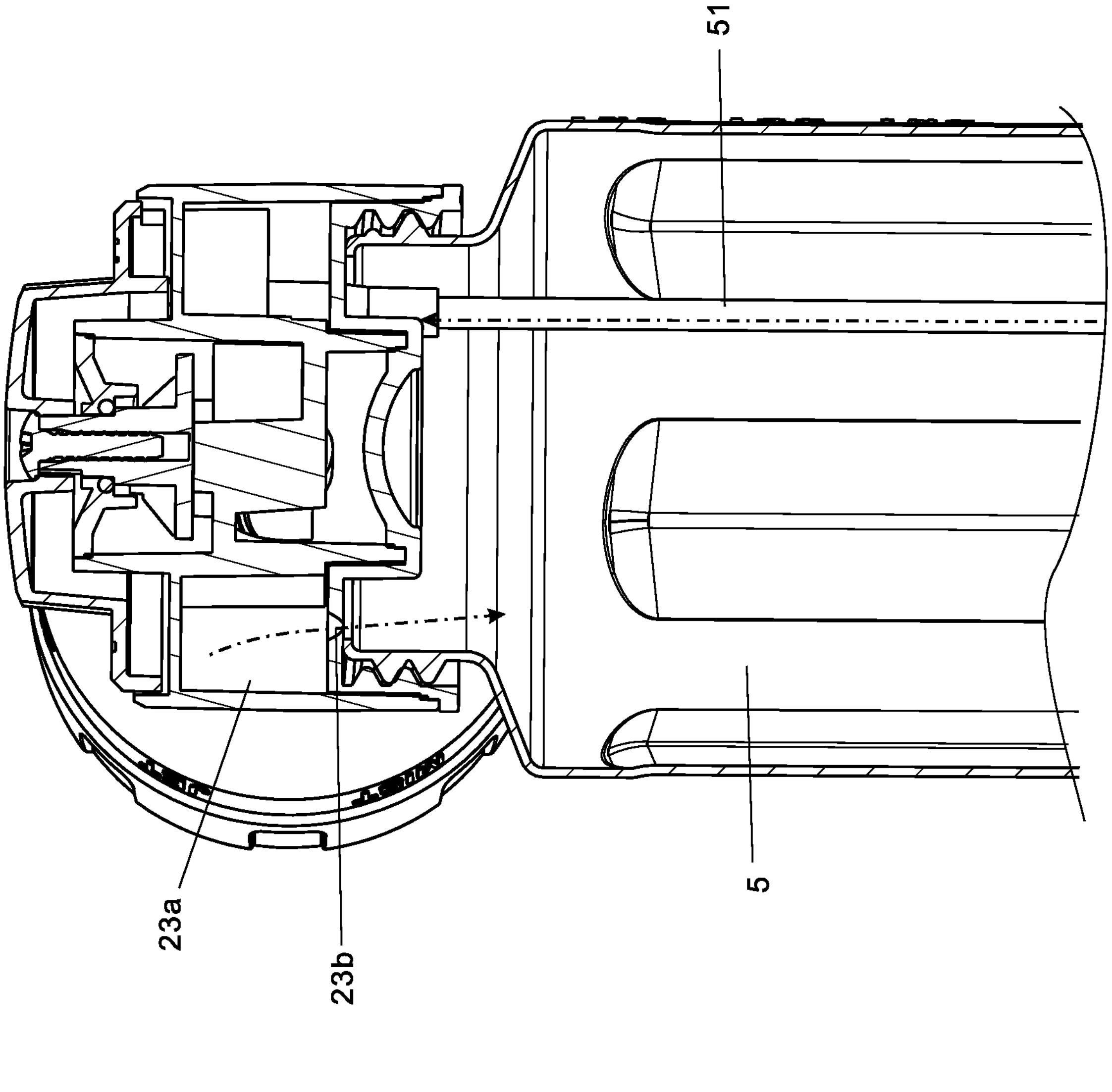
FIG. 8 is another partial sectional view of an embodiment according to the present invention.
Figure 9:
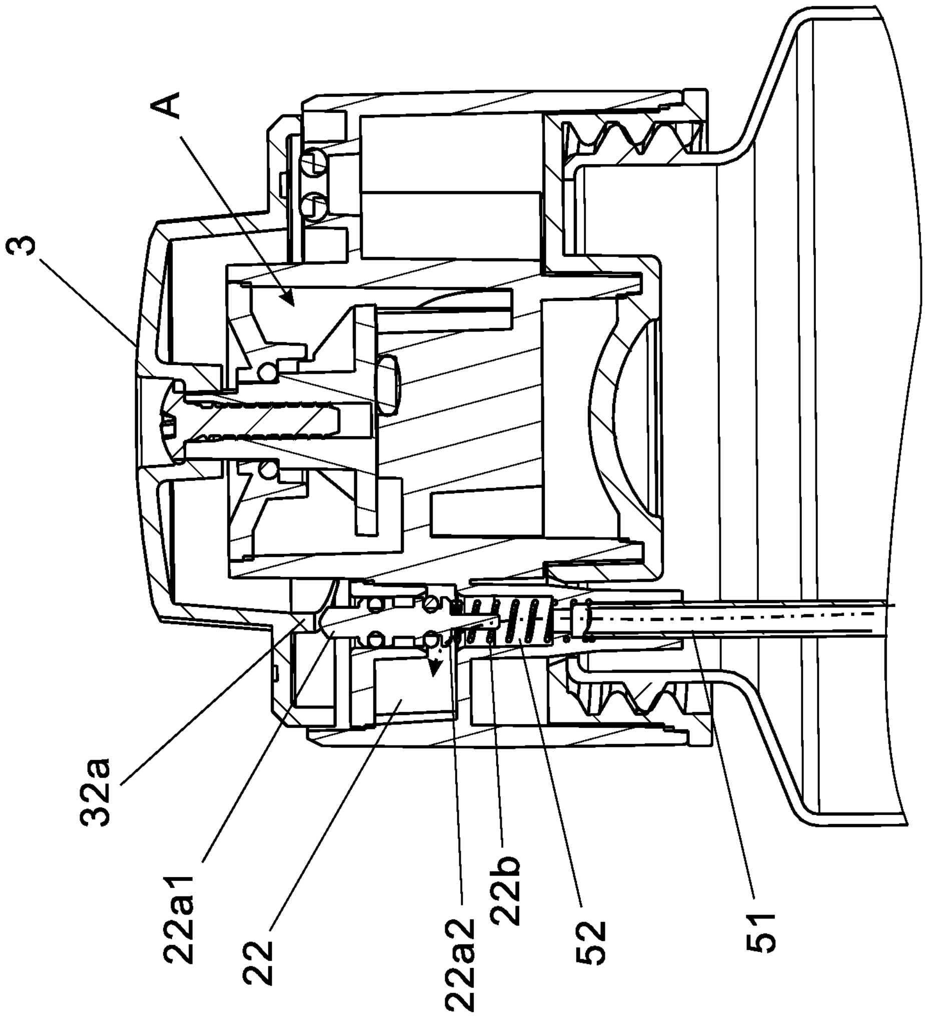
FIG. 9 is a partial sectional view of an embodiment according to the present invention in which a valve is aligned with a first end of a ramp of an adjustment portion.
Figure 10:
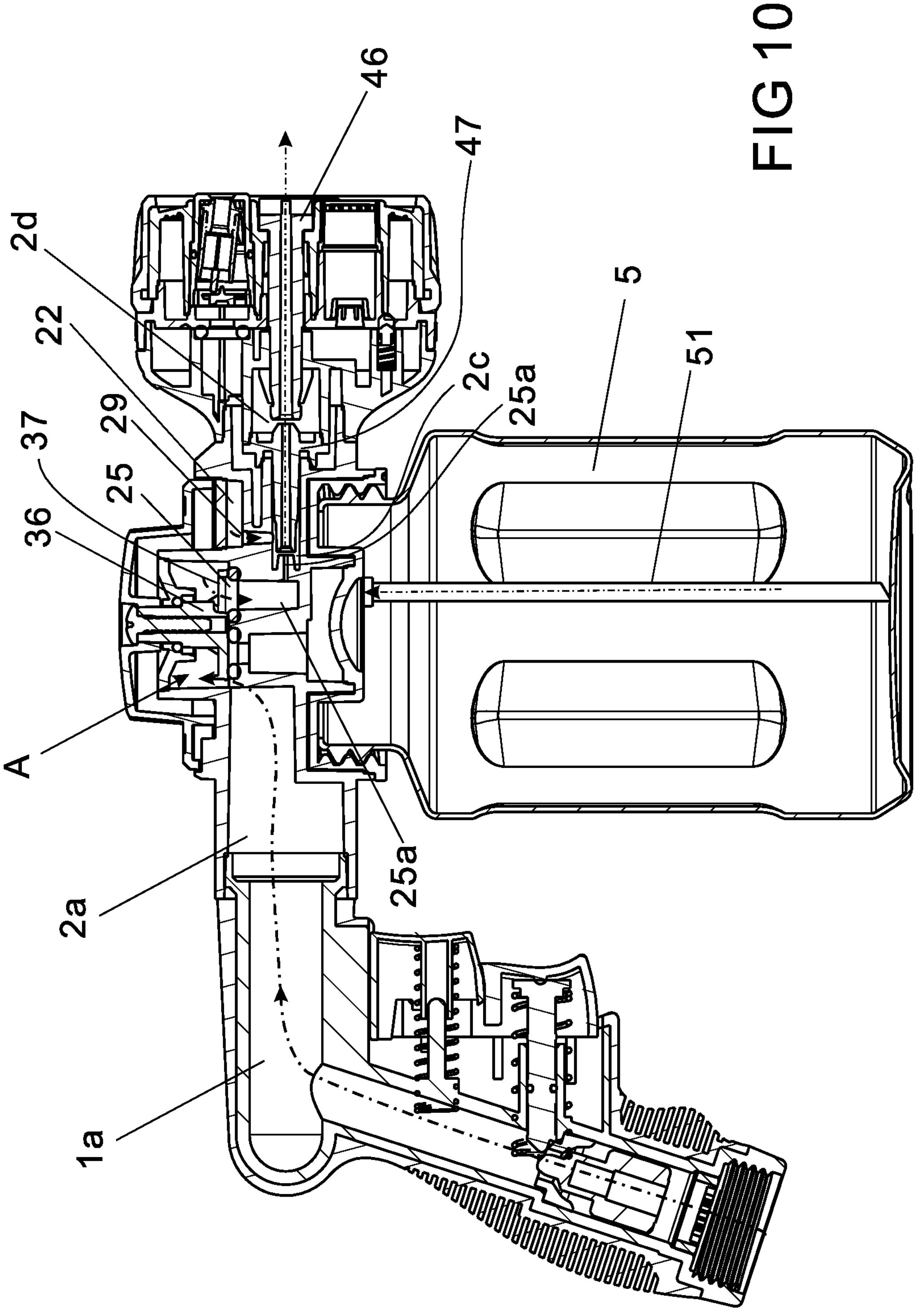
FIG. 10 is a top view of an embodiment according to the present invention showing a diversion chamber and a liquid storage room.
Figure 15:
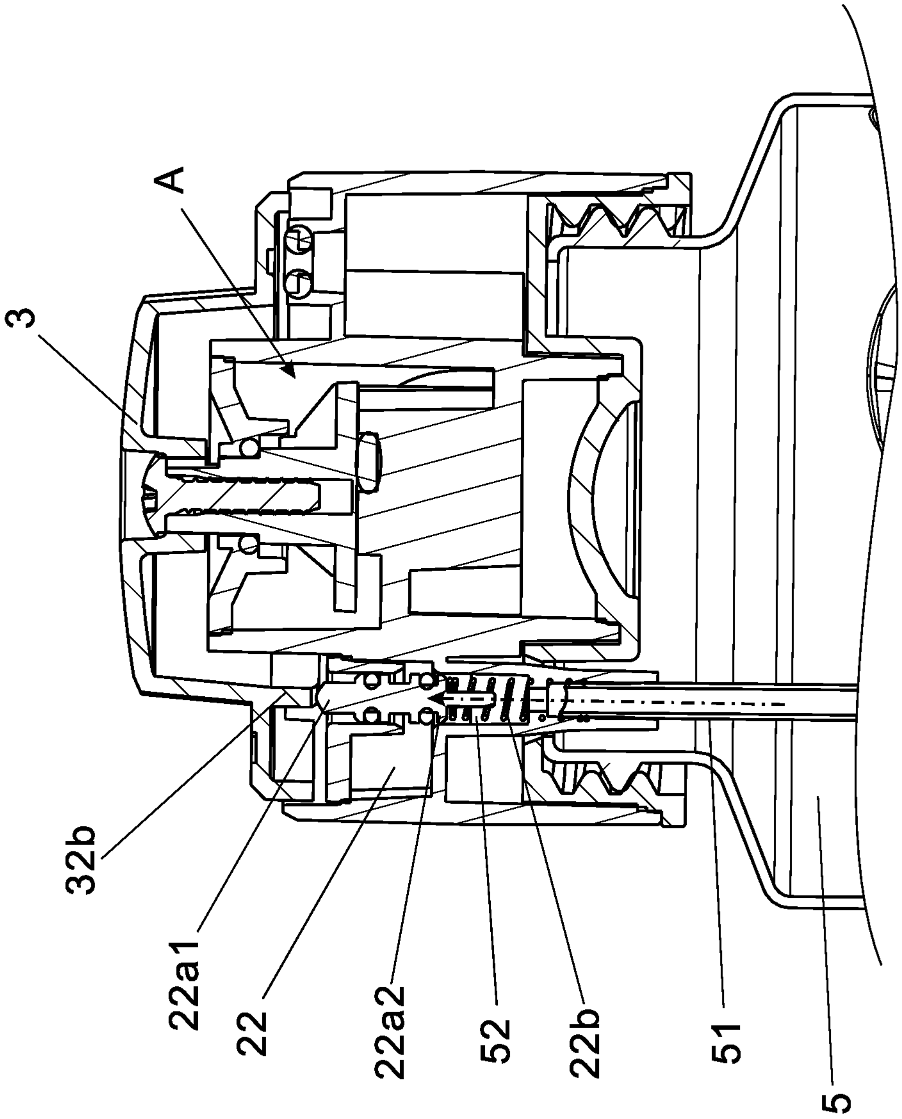
FIG. 15 is a partial sectional view of an embodiment according to the present invention in which a valve is aligned with a second end of a ramp of an adjustment portion.

Referring to FIGS. 3, 7, and 15, a ramp 32 is arranged at the rotary button 31 of the adjustment portion 3 and composed of a first end 32*a*, an extended second end 32*b*, and an extended third end 32*c*. The ramp 32 slopes upward gradually from the first end 32*a* to the second end 32*b* and a locking hole 33 is mounted to the second end 32*b* while the surface between the second end 32*b* and the extended third end 32*c* is kept at the same level. The top end 22*a*1 of the valve 22*a* is abutting against the ramp 32 correspondingly and the vertical movement of the valve 22*a* is controlled by the position of the ramp 32 with respect to the position of the valve 22*a*. Referring to FIGS. 3, 8, and 9, a curved groove 34 is disposed on one end of the ramp 32. The housing 2 is provided with an air channel 23 which is composed of a first vent hole 23*a* located on a top surface and a second vent hole 23*b* located on a bottom surface. The first vent hole 23*a* is communicating with the work surface 21 and the second vent hole 23*b* is communicating with the container 5. An oil seal ring is fitted on the first vent hole 23*a* and the surface of the oil seal ring is abutting against the curved groove 34 of the rotary button 31.

Figure 4:
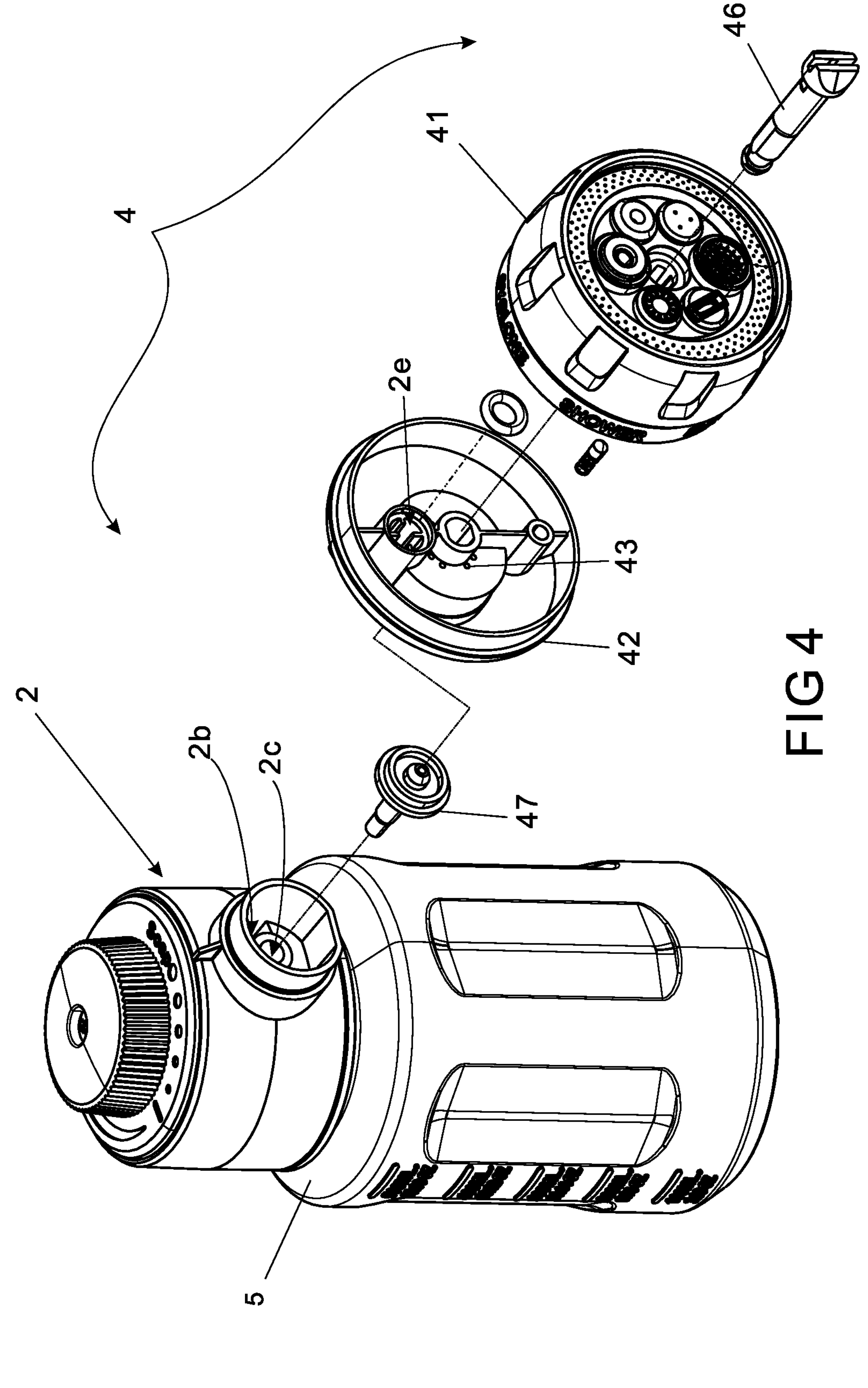
FIG. 4 is another partial assembly diagram and a partial exploded view of an embodiment according to the present invention.
Figure 5:
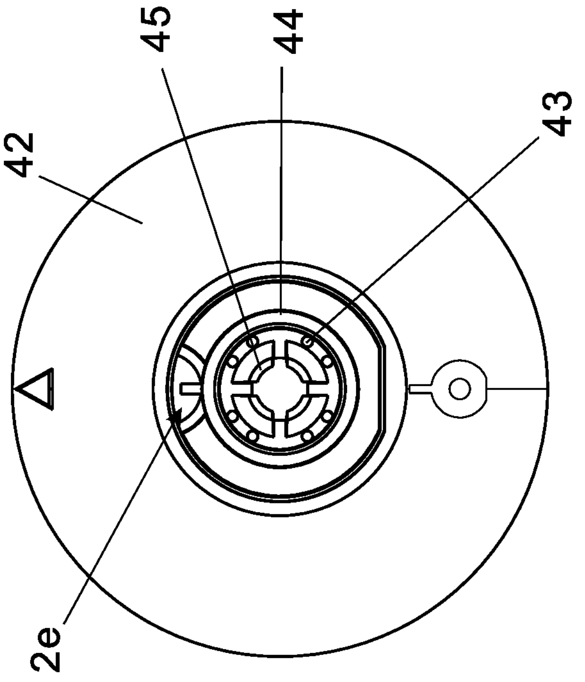
FIG. 5 is a rear view of a rear cover of an embodiment according to the present invention.

As shown in FIGS. 4, 5, 13, and 18, the spray portion 4 is composed of a spray head 41 and a rear cover 42 connected with each other tightly. The rear cover 42 is also connected with the second assembly end of the housing 2 firmly. The spray portion 4 has a mixture channel 2*d* extended and connected to the third distribution channel 2*c* and a clear-water channel 2*e* connected to the second distribution channel 2*b*. The spray head 41 is provided with a plurality of clear-water nozzles 41*a* and a mixture nozzle 46. By the spray head 4 being rotated manually, one of the clear-water nozzles 41*a* is selected and aligned with the clear-water channel 2*e* to spray out the water in one of the various spray patterns, such as linear splash or radial splash. In this embodiment, the clear-water channel 2*e* is formed in the rear cover 42 and is aligned with one of the clear-water nozzles 41*a* of the spray head 41. In other embodiments, the clear-water channel 2*e* is not limited to be mounted in the rear cover 42. The clear-water channel 2*e* is defined to be aligned with one of the clear-water nozzles 41*a* of the spray head 4 being selected and used for receiving water diverted to the second distribution channel 2*b* through the first diversion port 24. As shown in FIG. 4 and FIG. 5, the rear cover 42 includes a first portion 44 which is provided with a mounting hole 45 for mounting the mixture nozzle 46 of the spray head 41 correspondingly and a plurality of air inlet holes 43 arranged around the periphery of the mounting hole 45. The mounting hole 45 is assembled with an assembly nozzle 47, which is aligned with the mixture nozzle 46. Both the assembly nozzle 47 and the mixture nozzle 46 are provided with a passage for output of diluted solution and bubble solution.

Figure 6:
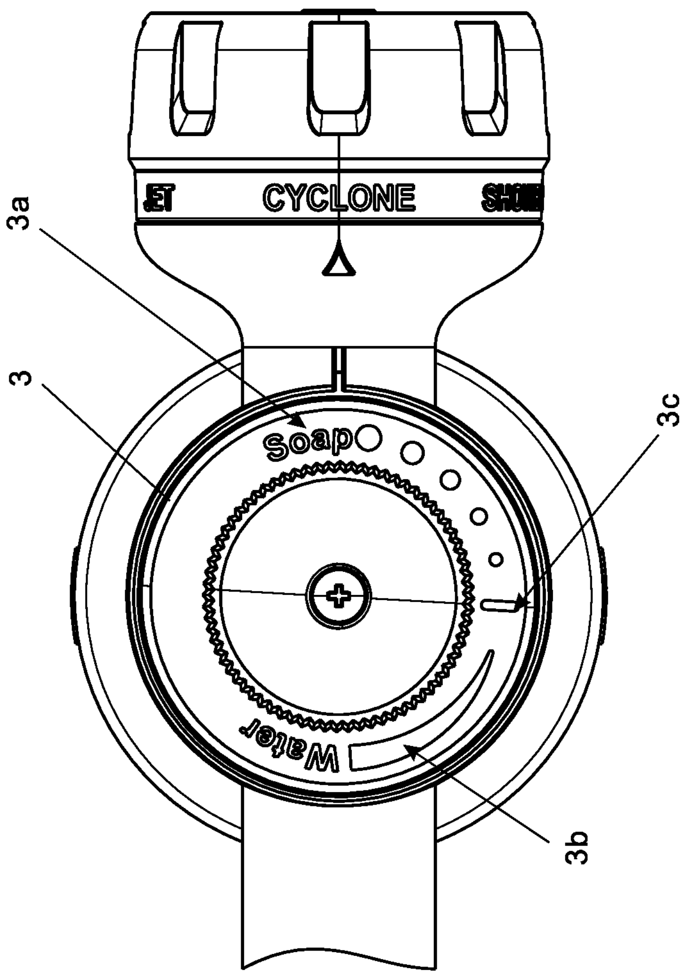
FIG. 6 is a top view of an embodiment in which a Soap mark is aligned with a positioning marker according to the present invention.

Referring to FIGS. 6-14, how bubbles are sprayed out is revealed. As shown in FIG. 6, one may rotate the rotary button 31 of the adjustment portion 3 to make a Soap marker 3*a* align with the positioning marker and the valve hole 37 on the selector 36 will be aligned with the second diversion port 25 while the first diversion port 24 is closed. Referring to FIG. 8 and FIG. 9, the curved groove 34 of the rotary button 31 is aligned with the first vent hole 23*a*. Also, referring to FIG. 10, by the operation portion 1, water is introduced, flowing through the first distribution channel 2*a* and into the second diversion port 25 to generate a negative pressure. Thereby, air is introduced into the air channel 23 through the first vent hole 23*a*, then passed through the second vent hole 23*b* and entered the container 5. Owing to the air pressure, liquid in the container 5 is delivered to the siphon channel 52 through the liquid pipe 51 to have siphon effect by which the liquid is further delivered up to the valve 22*a* through the liquid pipe 51*b*. Now as shown in FIG. 9, the first end 32*a* of the ramp 32 is aligned with the top end 22*a*1 of the valve 22*a* and the valve 22*a* is pushed by the spring 22*b* to move upward, so that the bottom end 22*a*2 of the valve 22*a* is opened and communicating with the siphon channel 52. As shown in FIGS. 11-14, water from the second diversion port 25 is flowing through the pipeline 25*a* and diverted into the third distribution channel 2*c*. At the same time, the liquid in the liquid storage room 22 is flowing into the third distribution channel 2*c* through the delivery channel 29 and mixed with the water from the pipeline 25*a* to form the diluted solution. Lastly, the diluted solution is mixed with air from the air inlet holes 43 by the impact of water flow while arriving the mixture channel 2*d* to form bubble solution at the mixture channel 2*d*. Then, the bubble solution is sprayed out through the mixture nozzle 46.

Although the diluted solution is blended with the air to form the bubble solution at the mixture channel 2*d* as mentioned above, the bubble solution with specific features in the sprayer can also be formed in one of other distribution channels of the housing 2. For example, the mixture channel 2*d* can be an extension of the third distribution channel 2*c* to the mixture nozzle 46 and the clear-water channel 2*e* can be an extension of the second distribution channel 2*b* to the clear-water nozzle 41*a*.

Referring to FIGS. 6, 9, and 15, the concentration of the bubble solution is adjusted in this embodiment. One may rotate the rotary button 31 to make a large-to-small marker of the Soap marker (for bubble solution) 3*a* align with the positioning marker. The ramp 32 slopes upward gradually from the first end 32*a* to the second end 32*b*, so that the valve 22*a* is able to be pressed downward when the ramp 32 presses against the top end 22*a*1 of the valve 22*a*. The opening of the siphon channel 52 is further minimized by the bottom end 22*a*2 of the valve 22*a*, so that the amount of the liquid flowing into the liquid storage room 22 is gradually reduced. As shown in FIG. 9, the opening of the siphon channel 52 is opened to the maximum when the top end 22*a*1 of the valve 22*a* is abutting against the first end 32*a* of the ramp 32. Thereby, a lot of liquid is flowing into the liquid storage room 22 and then entering the third distribution channel 2*c* through the delivery channel 29 for being mixed with the water from the pipeline 25*a* and obtaining the diluted solution with higher concentration. Lastly, the diluted solution is blended with air from the air inlet holes 43 by impact of water flow while arriving the mixture channel 2*d* to form bubble solution with higher concentration that is sprayed out through the mixture nozzle 46. On the other hand, as shown in FIG. 15, the top end 22*a*1 of the valve 22*a* is abutting against the second end 32*b* of the ramp 32, so that the opening of the siphon channel 52 is opened to the minimum degree. Thus, only a little amount of liquid is flowing into the liquid storage room 22 and then entering the third distribution channel 2*c* through the delivery channel 29 to be mixed with the water from the pipeline 25*a* and getting the diluted solution with lower concentration. Lastly, the diluted solution is blended with air from the air inlet holes 43 by impact of water flow while arriving the mixture channel 2*d* to form bubble solution with lower concentration to be sprayed out through the mixture nozzle 46.

Based on the above arrangement, rotation of the rotary button 31 is used to adjust the amount of the concentrated solution flowing into the liquid storage room 22 by siphon effect and further control the concentration of the bubble solution sprayed out.

Figure 16:
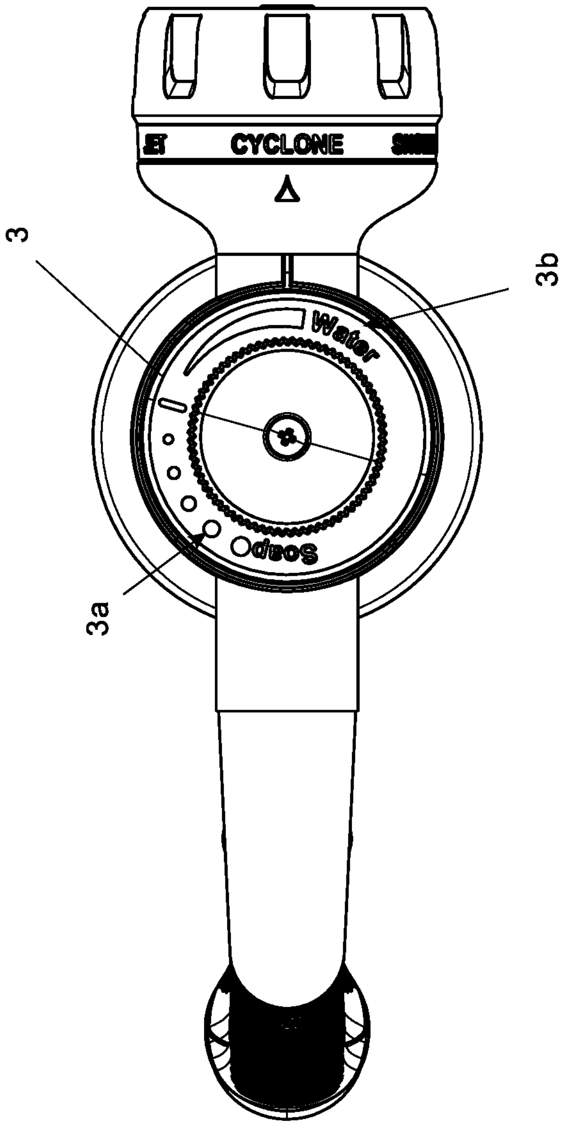
FIG. 16 is a top view of an embodiment according to the present invention in which a Water marker is aligned with a positioning marker.
Figure 17:
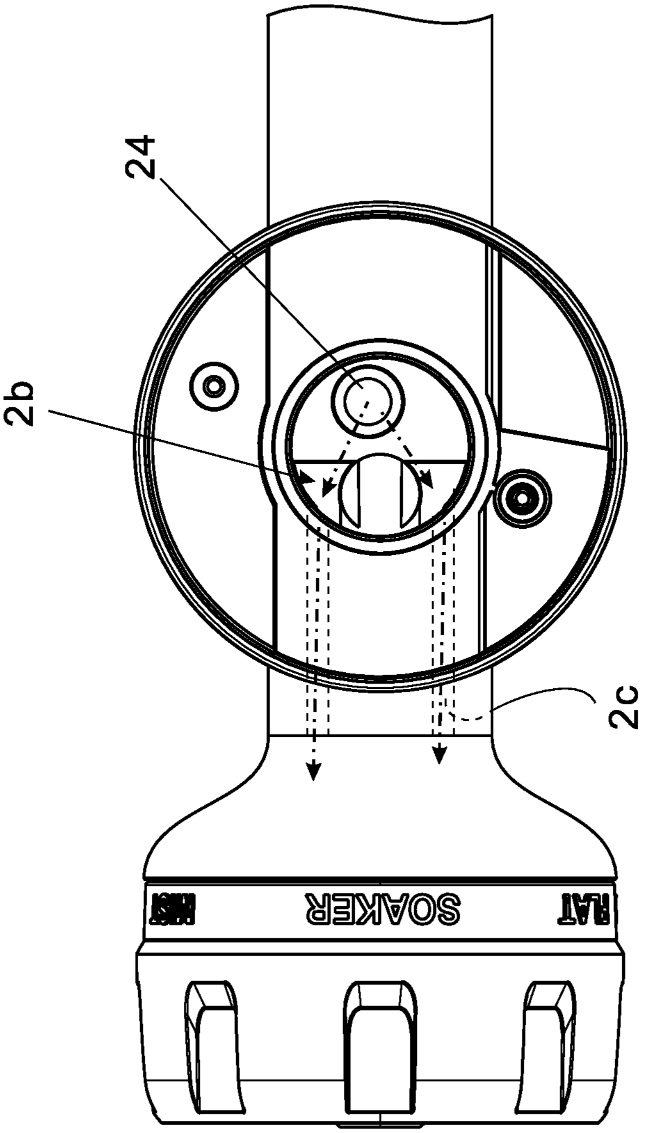
FIG. 17 is a bottom view of an embodiment according to the present invention.
Figure 18:
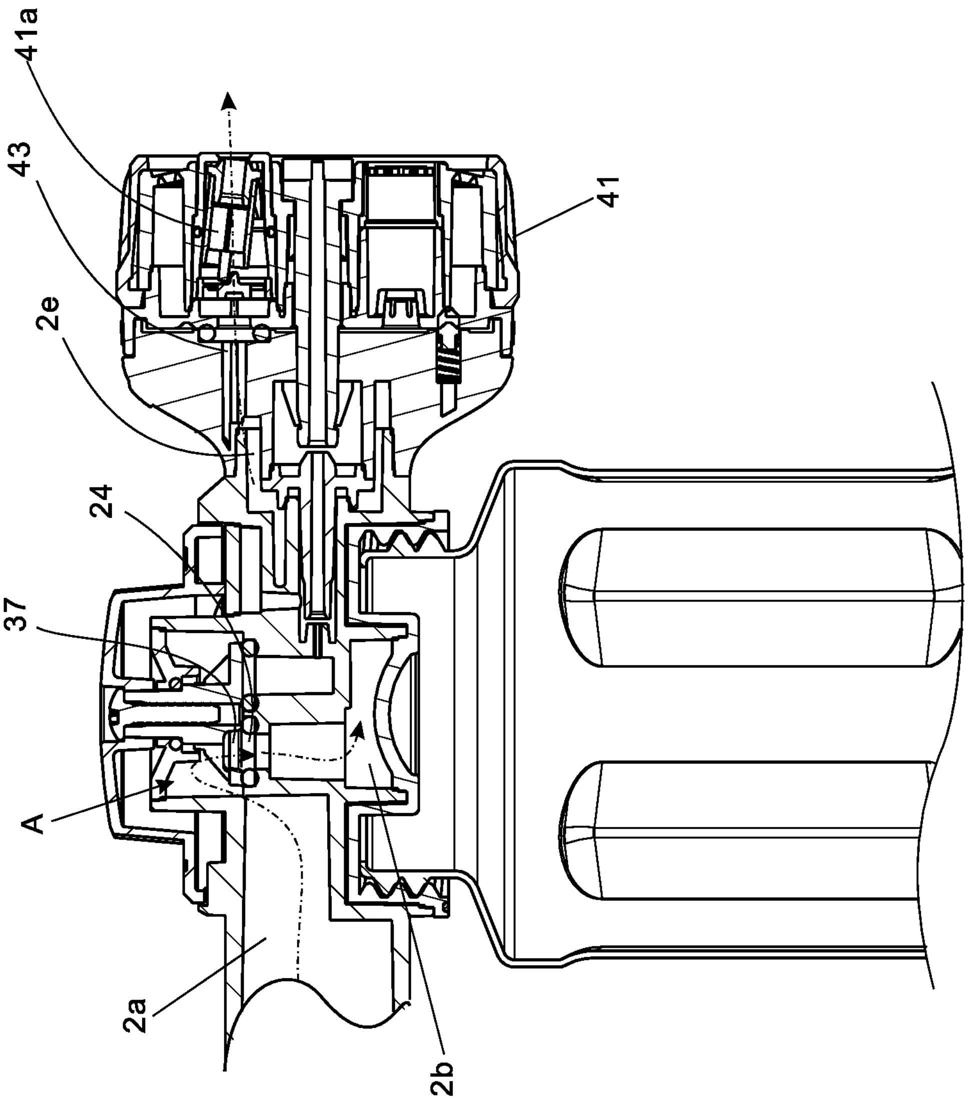
FIG. 18 is a schematic drawing showing how water is sprayed out of an embodiment according to the present invention.

Referring to FIGS. 16-18, an embodiment which is adjusted to spray water only is revealed. One may rotate the rotary button 31 of the adjustment portion 3 to make a Water marker 3*b* align with the positioning marker. Therefore, the valve 22*a* is abutting against the area between the second end 32*b* and the third end 32*c* of the ramp 32, so that the valve 22*a* is pressed downward to close the opening of the siphon channel 52. The valve hole 37 on the selector 36 is aligned with the first diversion port 24 while the second diversion port 25 is closed. By the operation portion 1, water is introduced and flowing into the first distribution channel 2*a*, through the diversion chamber A, the first diversion port 24, and then into the second distribution channel 2*b*, as shown in FIG. 17. Lastly the water reaches the clear-water channel 2*e* to be sprayed out through the selected clear-water nozzles 41*a* of the spray head 41. This is the clear-water mode, as show in FIG. 18.

Figure 19:
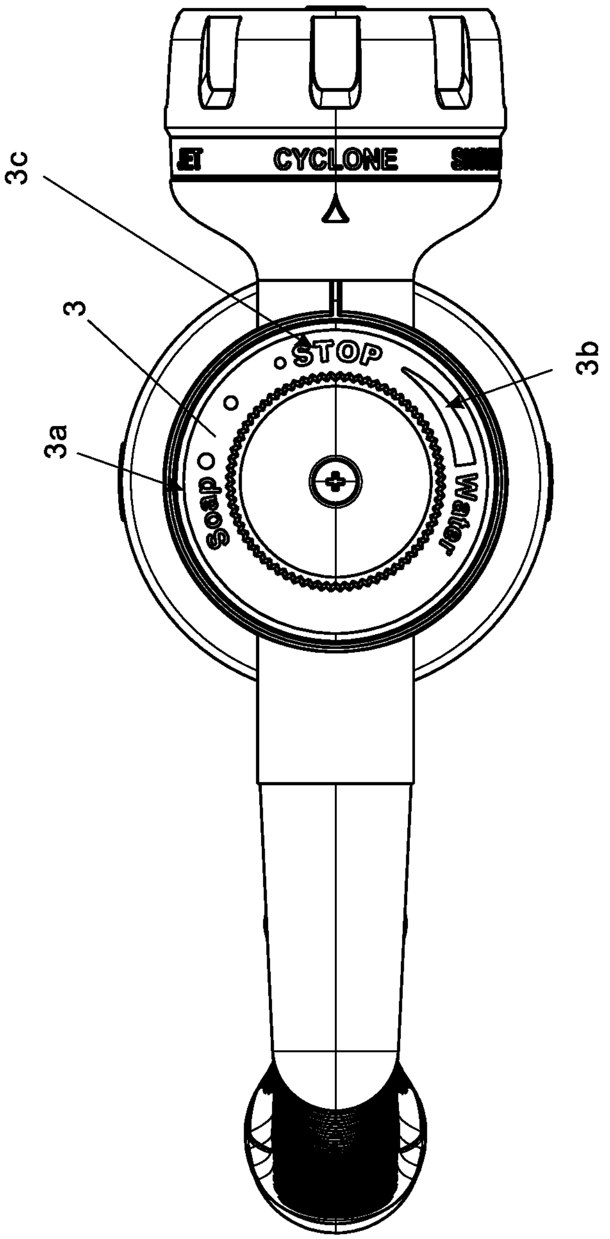
FIG. 19 is a top view of an embodiment according to the present invention in which a STOP mark is aligned with a positioning marker.
Figure 20:
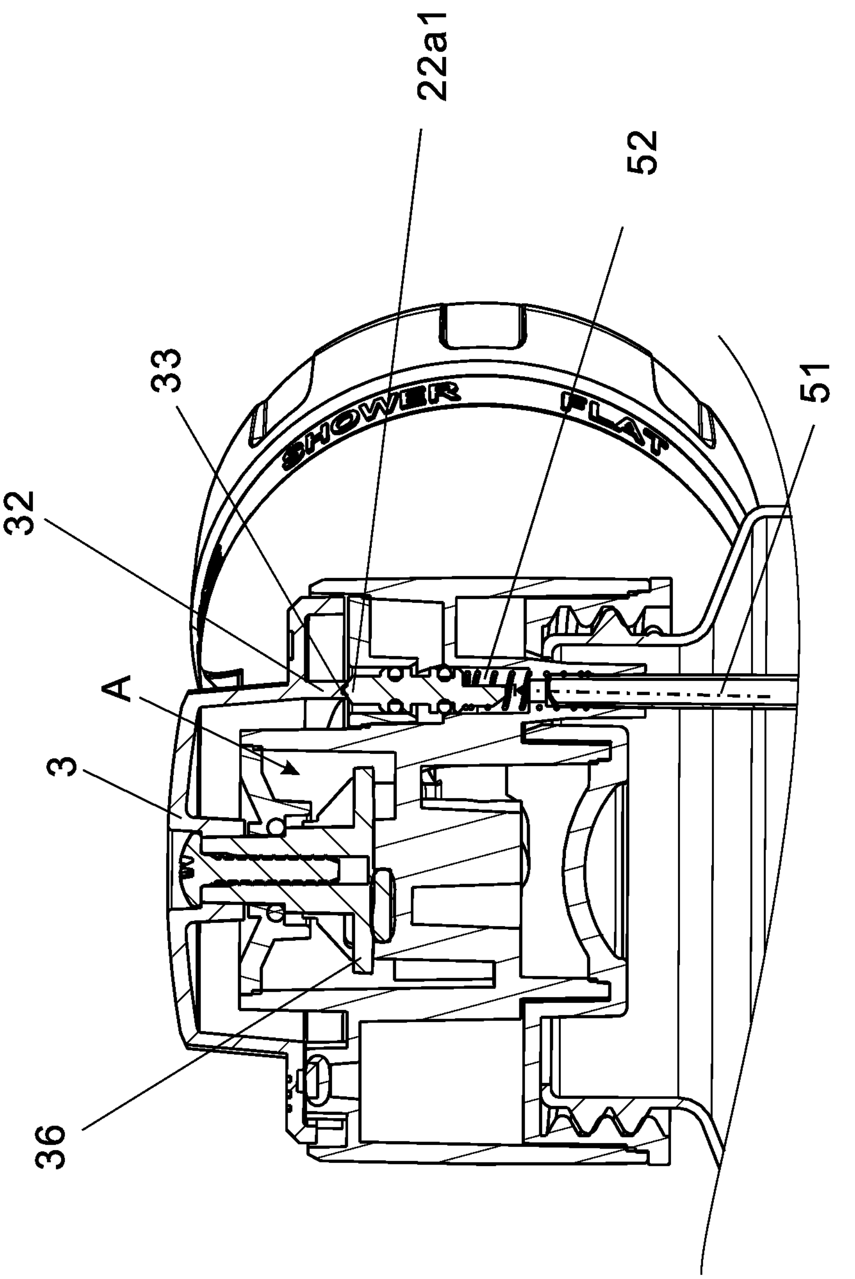
FIG. 20 is a partial sectional view of an embodiment according to the present invention in which a valve is aligned with a locking hole of a ramp.

As shown in FIG. 19 and FIG. 20, one may stop spraying of the bubble solution by rotating the rotary button 31 of the adjustment portion 3 to make the STOP marker 3*c* align with the positioning marker. Therefore, both the first diversion port 24 and the second diversion port 25 are closed by the selector 36 at the same time. The locking hole 33 at the second end 32*b* of the ramp 32 of the rotary button 31 is mounted with the top end 22*a*1 of the valve 22*a* and the valve 22*a* is pressed downward, so that the opening of the siphon channel 52 is closed by the bottom end 22*a*2 of the valve 22*a*.

In summary, the sprayer according to this embodiment of the present invention has the following operation modes.

Mode 1: the water is flowing into the first diversion port 24 through the diversion chamber A and then sprayed out through one of the clear-water nozzles 41*a* selected. Under this mode, only water is provided and sprayed for washing or other purposes.

Mode 2: the water is introduced into the second diversion port 25 through the diversion chamber A and mixed with the liquid from the container 5 in the channel of the housing 2 to form the diluted solution. Then, the diluted solution is mixed with external air while reaching the spray portion 4 to form the bubble solution to be sprayed out through the mixture nozzle 46. Under this mode, the bubble solution is provided and sprayed for washing.

Mode 3: the rotary button 31 is rotated for adjustment of the amount of liquid flow. Owing to design of the ramp 32 of the rotary button 31, the valve 22*a* is adjusted to open the opening of the siphon channel 52 in a stepless manner. Thereby, the amount of the liquid flowing into the liquid storage room 22 of the housing 2 can be adjusted. The liquid provided is mixed with water to get the diluted solution and the concentration of the diluted solution is further controlled by the amount of the liquid provided. The concentration of the bubble solution obtained can also be adjusted.

Mode 4: a washing mode used to control the concentration of the bubble solution or the amount of water being provided and sprayed out.

Mode 5: To stop spraying, one may select the stop mode so that both the first diversion port 24 and the second diversion port 25 are closed. Under this mode, no solution/liquid is able to be sprayed out.

In summary, the sprayer according to this embodiment of the present invention features on that the spray portion 4 is connected to the housing 2 which is provided with the mixture channel 2*d* and the clear-water channel 2*e* while the diversion chamber A can be selected to be communicated with either the mixture channel 2*d* or the clear-water channel 2*e*. The spray head 41 which can be rotated manually is provided with a plurality of clear-water nozzles 41*a* arranged around the mixture nozzle 46. One of the clear-water nozzles 41*a* is selected by manual rotation of the spray head 41 to be aligned with the clear-water channel 2*e* and the mixture nozzle 46 is aligned with the mixture channel 2*d*. The adjustment portion 3 is rotated manually to be aligned with the diversion chamber A for allowing water flowing to the selected clear-water nozzle 41*a* and then sprayed out in different patterns. Or the adjustment portion 3 is rotated manually to be aligned with the diversion chamber A for allowing both water and concentrated liquid flowing into the mixture channel 2*d* and then the mixed solution is sprayed out through the mixture nozzle 46.

The present sprayer has the following advantages. First the spray portion 4 is provided with at least one clear-water nozzle 41*a* and a mixture nozzle 46. The clear-water nozzles 41*a* are arranged around the mixture nozzle 46. The adjustment portion 3 is manually rotated to be aligned with the first diversion port 24, so that water from the first diversion port 24 is flowing through the clear-water channel 2*e* and the clear-water nozzle 41*a* to be sprayed out in different patterns. The adjustment portion 3 can also be manually rotated to be aligned with the second diversion port 25, so that the mixed solution (bubble solution), which is a mixture of water and the concentrated liquid, is introduced into the mixture channel 2*d* and sprayed out through the mixture nozzle 46. The sprayer according to this embodiment of the present invention features on that the nozzles for spraying the water and the nozzle for spraying the mixed solution are separated from each other, so that water sprayed out won't have residual bubble solution.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A sprayer, comprising:

a housing, provided with a diversion chamber, an adjustment portion, disposed on the housing and connected to the diversion chamber, and a spray portion, connected to one end of the housing and provided with a spray head;

a mixture channel and a clear-water channel being extended and arranged between and communicating with the housing and the spray portion; and the adjustment portion, adapted to be rotated and aligned with the diversion chamber for allowing the diversion chamber to be communicating with either the mixture channel or the clear-water channel, wherein the sprayer is characterized in that the spray head is provided with at least one clear-water nozzle and a mixture nozzle, wherein the clear-water nozzle is arranged around the mixture nozzle, wherein the clear-water nozzle is aligned with the clear-water channel and the mixture nozzle is aligned with the mixture channel, wherein the adjustment portion is able to be rotated manually for allowing water flowing to the clear-water nozzle to be sprayed out, wherein the adjustment portion is able to be rotated manually for allowing both water and liquid flowing into the mixture channel and then mixed to form mixed solution which is sprayed out through the mixture nozzle, wherein the housing includes an air channel, which has a first vent hole located on a top surface thereof and a second vent hole located on a bottom surface thereof.

2. The sprayer, as recited in claim 1, wherein the housing is connected to a container containing liquid, wherein the liquid is drawn into the housing by siphon effect and mixed with water to form the mixed solution, wherein the first vent hole is communicated with a work surface of the housing and the second vent hole is communicated with the container.

3. A sprayer for mixed solution and water comprising:

a housing, provided with a diversion chamber, an adjustment portion, disposed on the housing and corresponding to the diversion chamber, a spray portion, connected to one end of the housing and provided with a spray head; and a container, connected to the housing and filled with liquid, wherein the liquid is drawn into the housing due to siphon effect and mixed with water to form mixed solution;

a mixture channel and a clear-water channel being extended and arranged between and communicating with the housing and the spray portion, wherein the adjustment portion is adapted to be rotated and aligned with the diversion chamber for allowing the diversion chamber to be communicating with either the mixture channel or the clear-water channel, wherein the sprayer is characterized in that the spray head thereof is provided with at least one clear-water nozzle aligned with the clear-water channel and a mixture nozzle aligned with the mixture channel, wherein the adjustment portion is able to be rotated manually for allowing water flowing to the clear-water nozzle to be sprayed out, wherein the adjustment portion is able to be rotated manually for allowing both water and liquid flowing into the mixture channel to be mixed to form a mixed solution to be sprayed out through the mixture nozzle, wherein the housing includes an air channel, which has a first vent hole located on a top surface thereof and a second vent hole located on a bottom surface thereof, wherein the first vent hole is communicated with a work surface of the housing and the second vent hole is communicated with the container.

4. The sprayer, as recited in claim 3, wherein the spray head is manually rotatable and comprises a plurality of clear-water nozzles arranged around the mixture nozzle having different spray patterns, wherein one of the clear-water nozzles is selected by manual rotation of the spray head for spraying out water.

5. The sprayer, as recited in claim 3, wherein the housing is provided with a plurality of distribution channels including a first distribution channel, a second distribution channel, and a third distribution channel, wherein the diversion chamber includes a first diversion port and a second diversion port, wherein the first diversion port is communicated with the first distribution channel and the second distribution channel, while the second diversion port is provided with a pipeline extended from the second diversion port and communicated with the third distribution channel.

6. The sprayer, as recited in claim 5, wherein the mixture channel is an extension of the third distribution channel to the mixture nozzle and the clear-water channel is an extension of the second distribution channel to the clear-water nozzle.

7. The sprayer, as recited in claim 5, wherein a work surface is disposed around the diversion chamber, wherein a liquid storage room is formed on one side of the work surface, wherein a siphon channel is arranged at one end of the liquid storage room, while the other end of the liquid storage room is provided with a delivery channel which is communicated with the third distribution channel, wherein the siphon channel is connected with a valve and a spring is fitted around the valve for allowing the valve to move and return axially in the siphon channel, wherein the valve includes a top end and a bottom end, wherein the siphon channel is communicated with a liquid pipe of the container for delivering liquid to the liquid storage room, wherein the valve controls the opening and closing and the scale of an opening of the siphon channel, wherein the liquid arrives the liquid storage room, passes through the delivery channel, and flows into the third distribution channel.

8. The sprayer, as recited in claim 5, wherein the adjustment portion includes a selector and a valve hole which is mounted on one end of a diameter of the selector and to be aligned with the first diversion port or the second diversion port of the diversion chamber selectively.

9. The sprayer, as recited in claim 5, wherein the spray portion is composed of the spray head and a rear cover connected with each other, wherein the rear cover is connected to the end of the housing, wherein the mixture channel is connected to the third distribution channel and the clear-water channel is connected to the second distribution channel, wherein the rear cover includes a first portion which has a mounting hole arranged thereon for mounting the mixture nozzle of the spray head correspondingly and a plurality of air inlet holes arranged around the periphery of the mounting hole.

10. The sprayer, as recited in claim 3, wherein the liquid is selected from the group consisting of fertilizers, pesticides, detergents, and the combinations thereof.

* * * * *